June 6, 1944.   C. I. BRADFORD   2,350,545
MEASURING INSTRUMENT
Filed Aug. 30, 1941   3 Sheets-Sheet 1
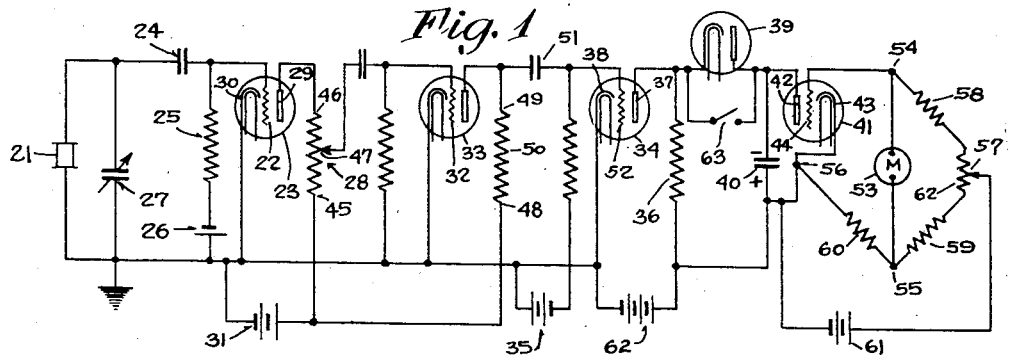
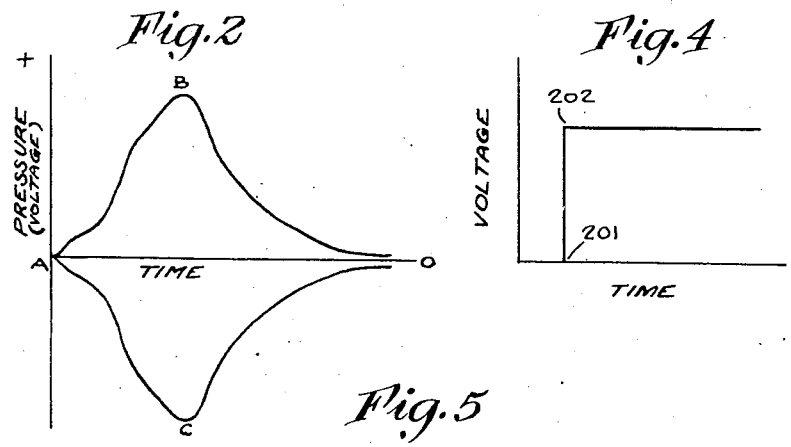
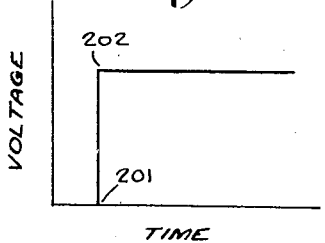
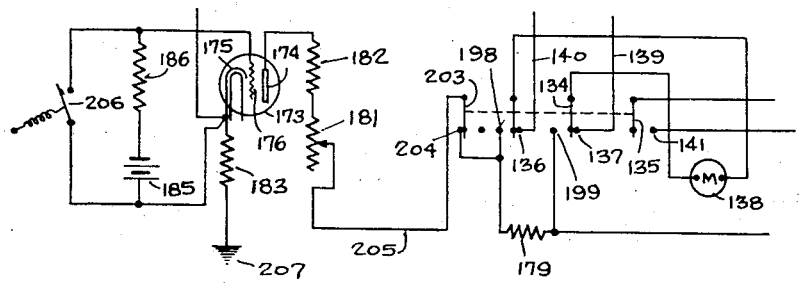
INVENTOR
COLIN IRVING BRADFORD
BY
ATTORNEYS

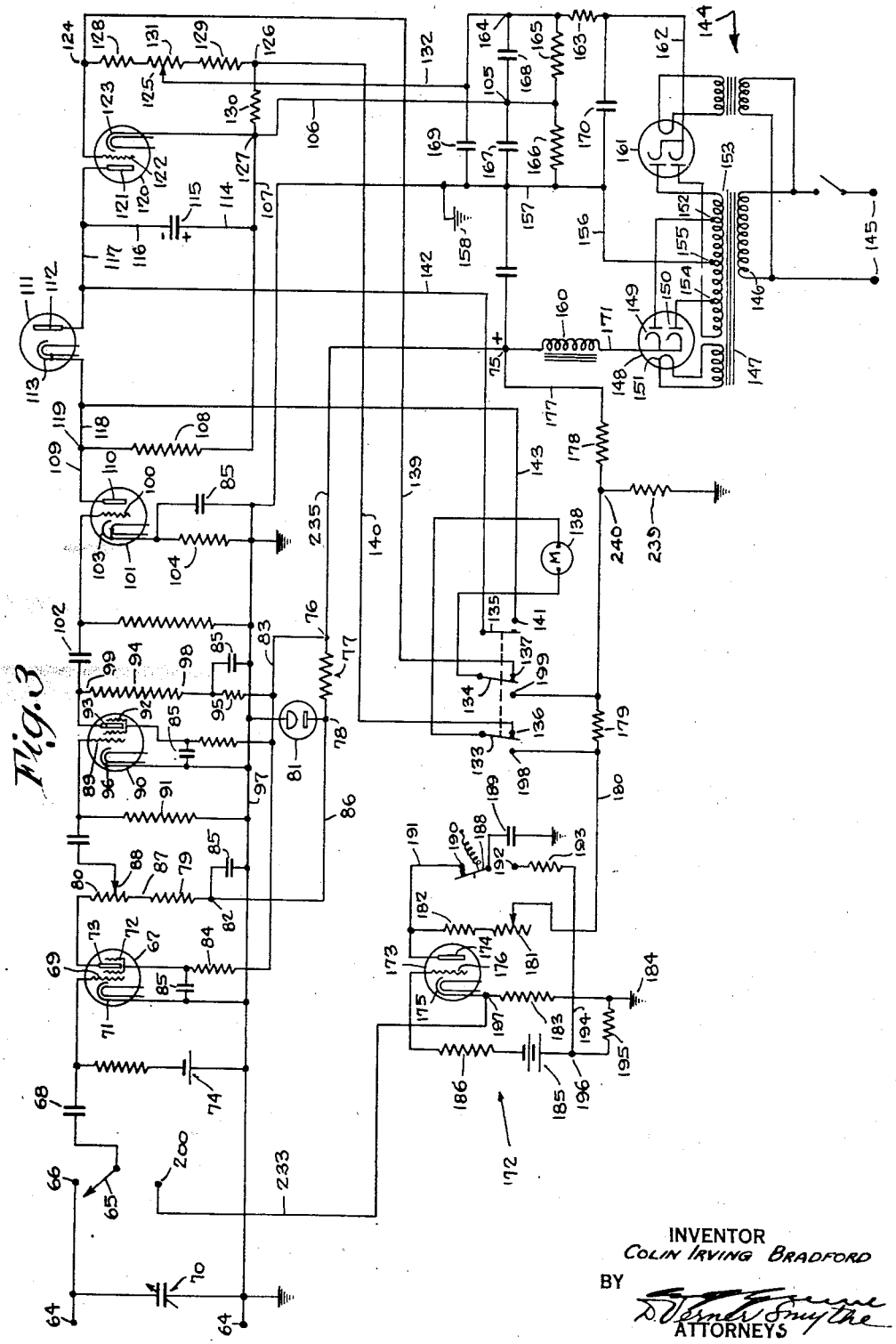

June 6, 1944.  C. I. BRADFORD  2,350,545
MEASURING INSTRUMENT
Filed Aug. 30, 1941   3 Sheets-Sheet 3
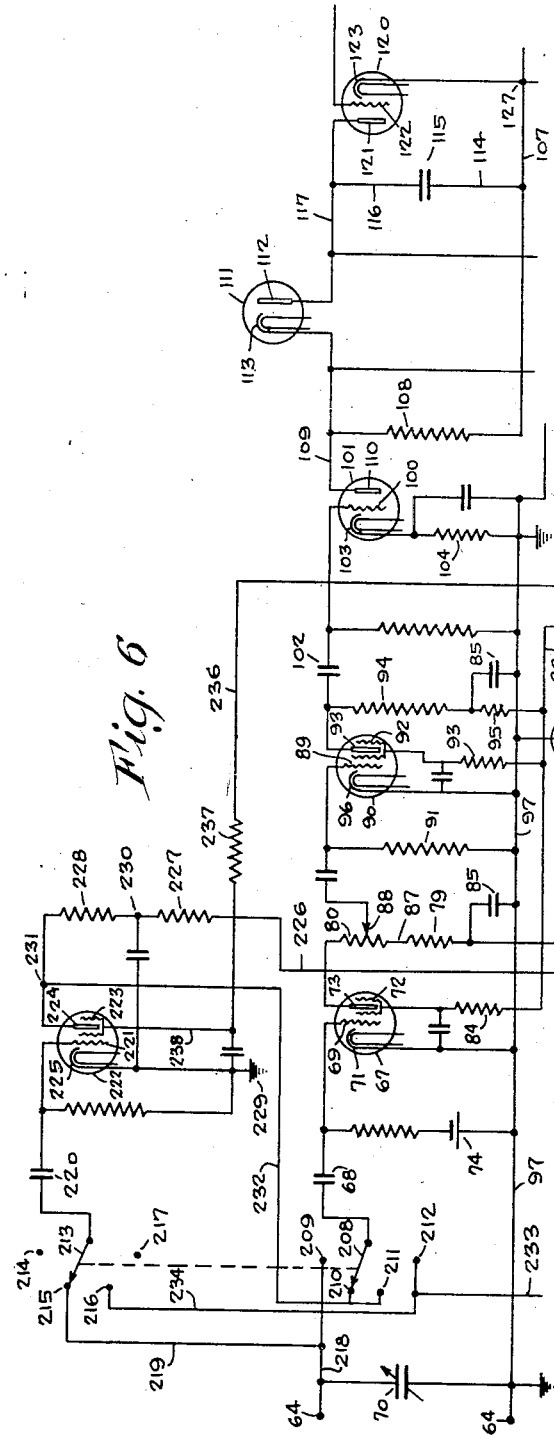
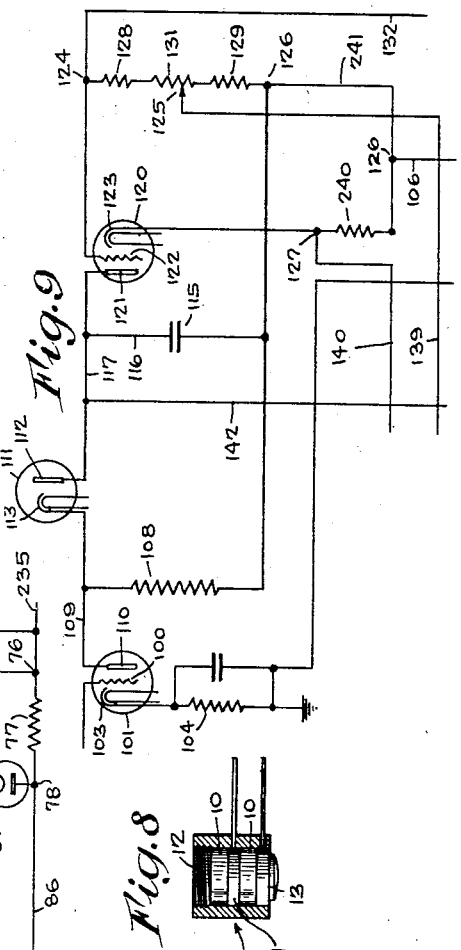
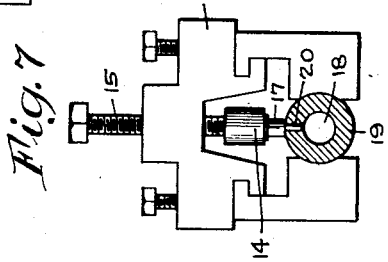
INVENTOR
COLIN IRVING BRADFORD
BY
ATTORNEYS Patented June 6, 1944

2,350,545

UNITED STATES PATENT OFFICE 2,350,545

MEASURING INSTRUMENT

Colin Irving Bradford, Fairfield, Conn., assignor to Remington Arms Company, Inc., a corporation of Delaware Application August 30, 1941, Serial No. 408,968

15 Claims. (Cl. 171—95)

This invention relates to an apparatus for measuring a change of condition, and especially for measuring a change in force, such as the pressure developed when a cartridge is fired in a gun. The invention will be described particularly in its application of determining the peak pressure developed in a gun by the use of a piezo-electric crystal as the means to set up a transient electrical surge proportional to the change. Any type of gauge may be used which gives a voltage output proportional to instantaneous pressures. The pressure developed at the time the powder is ignited and just before or after the projectile starts to move is very high, often approaching 60,000 lbs./sq. in. This increase in pressure is attained in an extremely short period of time and is rarely over 0.005 second. The ordinary type of pressure gauge, such as the Bourdon gauge, will not function as it does not have sufficient range normally and is not fast enough in its response to obtain accurate readings. There have been many various systems devised for the measurement of such pressure. One of the first of the recent methods was the use of a copper disc, which was indented by a particular style cutter upon firing of the cartridge, and the pressure determined from the size of the cut made in the copper disc. A later type, which is used extensively at the present, consists of a copper or lead cylinder which is subjected to the pressure to be measured and deformed thereby. The pressure can be determined from the deformation by comparing the change in dimensions of the cylinder with that of the change in a similar copper cylinder which has been calibrated in a suitable testing machine where known pressures can be exerted on the cylinder. One of the sources of error in this type of gauge is that the deformation of the copper cylinder exceeds the elastic limit and a flow of copper takes place. The flow requires time, so the pressure indicated will not be correct. Piezo-electric crystals have been used in connection with various types of electrical instruments, but the difficulty has been in providing a suitable electrical instrument to indicate the pressure due to the extremely high change in pressure over a short period of time. In a practical instrument suitable for use in testing such a pressure for manufacturing or production purposes, it is necessary that a satisfactory and simple method of calibration be provided, so that the testing can be carried out by personnel of limited training. It is also necessary that the instrument maintain the reading thereon for a sufficient length of time so that the operator can record the same. These and many other problems are involved in an electrical measuring instrument for the purposes described. The device may be used to measure other changes than the pressure developed in a gun barrel, such as, for example, to indicate the peak value of sound intensity accompanying the firing of a gun or ignition of explosives or in any other manner in which a transient electrical surge may be impressed on the circuit.

The other objects of the invention will appear from the following description, which is not to be construed as limiting.

In the drawings:

Fig. 1 is a circuit diagram of a simple form of the instrument.

Fig. 2 is an example of a pressure time curve.

Fig. 3 is a circuit diagram of a complete indicating instrument which may be used in actual practice, and which includes the fundamental circuit of Fig. 1.

Fig. 4 is a voltage time curve of the calibrating device of Fig. 3.

Fig. 5 is an alternative gaseous tube calibrating circuit which may be used in place of the one shown in conjunction with Fig. 3.

Fig. 6 is a circuit diagram of a portion of the indicator instrument shown in Fig. 3 and having added thereto an inverting calibrating circuit to be used in calibrating the piezo-electric crystal gauge or other type of responsive means used.

Fig. 7 is a cross sectional diagrammatic view of one type of piezo-electric crystal and mounting therefor.

Fig. 8 is a cross sectional view of the piezo-electric crystal and assembly per se.

Fig. 9 is an alternative electron tube voltmeter circuit which may be used if desired.

As has been stated previously, the device will be described in conjunction with the use of a piezo-electric crystal, but it is to be distinctly understood that other responsive devices may be used, giving a transient electrical surge corresponding to the change in condition or pressure to be measured. It has been found that when a plate cut from such a crystal as quartz is subjected to a compression force in the direction of the electrical axis normal to the faces that a quantity of electricity will be generated proportional to the force applied. Likewise when the force is released a quantity of electricity is developed.

In the production of ammunition it is necessary to test certain of the qualities thereof, and one of these is the pressure exerted as the cartridge is fired. This is an exceedingly high pressure rise in a very short space of time and generally takes the form shown in Fig. 2, which shows pressure plotted against time. In the ordinary 12 gauge shot shell, for example, the peak pressure is about 10,000 lbs./sq. in., and the time in which the peak is reached is about 0.001 second.

In Fig. 8 the crystals are at 10, which are separated by a plate 11 and held in place by the screw plug 12 and the sliding plug 13. The use of a plurality of faces thus arranged so that the pressure will develop a positive charge on the faces bordering the conducting plate 11 will result in the charge developed being the sum of the charges produced by the two crystals. It is possible to use more than two crystals and build up the quantity of electricity accordingly, but it has been found that two are generally sufficient for determining the pressure generated in a gun. The piezo-electric crystal assembly 14 may be inserted between the screw 15 held in a suitable holder 16 and a sliding piston 17 communicating with the interior 18 of the bore 19 of a barrel. The piston 17 is accurately fitted in the hole 20 in the barrel 19 so that there will be no leakage of gas pressure at this point.

Previously such a crystal has been used to operate the conventional cathode ray oscillograph to thereby obtain the pressure time curve. It is obvious that such has a disadvantage in that the curve is practically instantaneous and must be photographed in order to be read properly. The necessary apparatus is also far too complicated and difficult to use for production testing.

It became necessary, therefore, to devise a suitable circuit to read the electrical surge produced by the piezo-electric crystal when the cartridge is fired. Such a circuit may be similar to that shown in Fig. 1, which is diagrammatic in character. The gauge is shown at 21 and is connected to the control grid 22 of electronic tube 23. A suitable condenser 24 and resistance 25 may be used in this portion of the circuit in conjunction with a grid bias battery 26. The variable condenser 27 is placed across the piezo-electric crystal 21 so as to adjust the voltage developed in accordance with the calibration of the particular piezo-electric crystal being used and to make the meter read pressure directly. The variable condenser will also serve to allow changes in size of the piston used when measuring pressures so that the device may be readily set according to the area of the particular piston upon which the pressure is applied. The purpose of the variable condenser 27 will be more fully explained in conjunction with the description of the complete instrument. A variable potentiometer 28 is included in the plate circuit of tube 23, which includes plate 29, cathode 30, battery 31 and variable potentiometer 28. Where the term "cathode" is used, it means a directly or indirectly heated element.

During the build-up of the transient surge, produced by the firing of the cartridge, the negative potential on grid 22 becomes more positive so that tube 23 has the conductivity of the plate circuit increased. The increase in flow of current between points 45 and 46 of resistance 28 will cause a lowering of the potential at point 47, and in consequence thereof the grid 32 of tube 33 becomes more negative so that the plate flow in tube 33 is reduced. There is a given potential drop between the points 48 and 49 of resistance 50 for the steady state flow in the plate circuit, and a reduction in this flow, due to a reduction in the plate current, will cause 49 to have its potential raised because of the decreased flow. Point 49 is connected through condenser 51 to the control grid 52 of tube 34. Control grid 52 of tube 34 is biased normally negatively by the grid bias battery 35. The plate current flowing through electronic tube 34 will be increased from the positive side of battery 62 to resistance 36, plate 37, cathode 38, back to the negative side of battery 62. The electronic tube 39 may be a conventional unidirectional electronic tube, which will pass the surge in one direction or positive direction only. The condenser 40 will be charged and will not discharge due to the unidirectional action of tube 39 to prevent the flow of current in the opposite direction. The electronic tube voltmeter includes the electronic tube 41 having a plate element 42, cathode 43, and grid 44. It is to be noted, however, that the charge on condenser 40 must be maintained during the time necessary to read the meter, so that the leakage in tube 41 must be a minimum in order to prevent the discharge of the condenser 40.

It has been found that in an electronic tube used in the conventional manner with the control grid between the anode and cathode, that there is considerable leakage and that this leakage increases with an increase of space current. It may be theorized, although it is not absolutely known, that the flow of electrons from the cathode to the anode will ionize by collision with some of the residual gas in the vicinity of the control element. Because of the fact that the control element is negatively charged, the ionization will result in positive ions which are attracted to the control element, thereby neutralizing some of the negative charge thereon and increasing or causing flow in the circuit. It is evident, therefore, that if the control element is out of the direct path of flow of electrons from the cathode to anode and therefore remote from the positive ions when they are produced, that the leakage due to space current will not be as great as otherwise would be the case.

For this reason, the voltmeter tube 41 is inverted and has the conventional plate or anode 42 used as the control element and the conventional grid 44 used as the anode, the conventional grid 44 being located between the conventional anode 42 and cathode 43. The amplification factor, usually designated by $\mu$, is reversed so that the amplification is reduced or becomes $1/\mu$, the amplification factor being that conventionally used in the art.

It is to be pointed out that a recording instrument of suitable design may be used in place of the meter 53 if desired. An example of such an instrument would be a millivoltmeter or milliammeter type of recording instrument.

The electronic tube voltmeter is in the form of a bridge circuit with the tube 41 in one leg of the bridge. A meter 53, which may be of the conventional type of milliammeter, is connected across the points 54 and 55 of the bridge. The other apex of the bridge is located at 56 and 57. Resistances 58, 59 and 60 are located in the legs 54—57, 57—55, 55—56 respectively of the bridge. At the apex 57 there is a variable resistance 62 which may be adjusted so as to obtain the proper steady state reading. A battery 61 is connected between points 56 and 57, which serves as the source of potential for the tube 41. When a charge is placed upon condenser 40, the control element 42 is lowered in potential so that the flow will decrease between the elements 44 and 43. This will upset the steady state in the bridge circuit and will cause a deflection on meter 53 in accordance with the charge placed upon condenser 40. It is evident that because the flow in tube 41 decreases as the surge is impressed on the circuit that there is no danger of overloading tube 41. In order to prepare the device for the next reading, a switch 63 is provided for short circuiting tube 39 to discharge the condenser 40. Tube 39 is shorted instead of the condenser, because if the condenser itself is shorted it will then be necessary to re-charge the condenser to the steady state existent in the tube circuit 39.

Summarizing the action of this circuit, when an increase in pressure occurs such as between the points A and B of Fig. 2, a pressure will be exerted upon the piezo-electric crystal 21, which will produce a positive potential at control grid 22 of tube 23. The value of this potential may be adjusted by means of the variable condenser 27 in accordance with the calibration of gauge 21. The grid 22 upon becoming positive will cause an increase in the flow through the plate circuit of tube 23, thus causing a greater potential drop between points 45 and 47 of resistance 28. This in turn will result in a more negative condition on grid 32 of tube 33, which will reduce the plate circuit flow of tube 33. A reduction in the plate flow through tube 33 will cause a reduction in the drop in potential across resistance 50 so that point 49 will become more positive. This in turn will cause a raising in the potential of grid 52 of tube 34 so that the plate circuit of tube 34 will have an increase in flow therethrough. This increase in flow will be allowed to proceed in one direction through tube 39, thereby charging condenser 40, giving the plates the polarity indicated in Fig. 1. As the pressure decreases, there will be a decrease in the flow of the plate circuit of tube 34, but the discharge of the condenser upon the decrease will be prevented from passing through tube 39 because of the unidirectional characteristics thereof so that the condenser will retain the charge thereon. The charge on condenser 40 will result in a decrease in flow in tube 44 so that the previously balanced meter 53 in the electronic tube voltmeter will become deflected in accordance with the charge on condenser 40. It is a well-known phenomenon that the time required for a condenser to charge is directly proportional to the resistance in series therewith, and for this reason the effective resistance of tubes 34 and 39 must be extremely low. It is also necessary to have the connections between the plate of tube 39, control element of tube 41 and condenser 40 of an extremely high resistance relative to other associated parts of the circuit, so that the charge may be retained upon the condenser.

It is necessary that the condenser 40 of Fig. 1 have certain characteristics which must be strictly adhered to in order to get accurate results from the device. When a condenser is charged, there is a certain absorption in the dielectric, and this absorption must be kept at a minimum or within a certain range in order not to affect the accuracy of the final reading. There may be various theories evolved concerning the exact reason for the absorption which occurs in the dielectric of a condenser, but the exact explanation is not known. The effect of such absorption is that the voltage available on the condenser for measurement will be less than that impressed thereon because of the voltage lost due to absorption, and it is obvious that this must be kept at a minimum. It is believed that the dielectic absorption is due to an intermolecular action of some kind, although it is not definitely known. In the invention involved herein, the importance of minimizing absorption is apparent because the voltage on condenser 40 is read by the vacuum tube voltmeter circuit, and it is evident that any difference between this voltage and the impressed voltage will affect the accuracy. Certain dielectrics have been found to be particularly good, and among these may be mentioned mica, polystyrene, and quartz. It is to be pointed out that the mica must be carefully selected to be satisfactory. The measurement of the absorption is difficult, due to the small quantities involved. The quantities are sufficient, however, to make the instrument inaccurate and to prevent the scale from being linear. One way of expressing the value of the absorption may be the absorption factor "$k$" which may be defined as $$k = \frac{\frac{Q}{C} - V_c}{\frac{Q}{C}}$$

wherein $k$ is the absorption factor, $Q$ is the quantity of charge, $C$ the capacity of the condenser, and $V_c$ the voltage appearing on the plates of the condenser after it has been charged, assuming there is no leakage. It has been found that this voltage must be at least 99% of that impressed thereon in order to obtain accurate readings, so that the absorption factor should not be greater than 1% in order to obtain the desired results. It will, of course, be understood that if such accurate reading it not required, a larger absorption factor may be used. There are other ways of determining the absorption factor, such as by impressing an alternating current of varying frequency on the condenser and noting the change in the loss factor as the frequency changes. It has been found that the difference in capacity between 10 kilocycles and 10 cycles should not be much over 0.1%. With higher frequency, a large absorption will result in a decreasing capacity. If there was no loss the capacity would be the same at all frequencies. At the higher frequencies, the time during which the voltage is applied to the condenser decreases so that a higher absorption results in a lower capacity.

Referring to Fig. 3, the diagram shown may be used for a complete indicating instrument suitable for practical use, and includes the fundamental circuit of Fig. 1, a calibrating circuit and a power supply circuit. The fundamental circuit will be discussed first, as there are some differences between the circuits of Fig. 1 and Fig. 3.

The transient surge developed by a suitable gauge may be impressed across terminals 64. The switch 65 is placed in contact with 66 so that the surge will be placed on the first amplifying tube 67 through condenser 68 and on the control grid 69 of said tube 67. The variable condenser 70 used is similar to 27 of Fig. 1, for the purpose of allowing for the differences in the various gauges that might be employed. The tube 67 may be of the conventional screen grid type having cathode 71, screen grid 72 and anode 73. It is to be understood, however, that various types of suitable tubes may be used. The battery 74 serves as a grid bias battery biasing 69 negatively so that the positive impulse put on 69 by the build-up of the surge will increase the flow in the plate circuit of tube 67. The plate circuit of tube 67 includes the positive power lead from the power supply 75, line 235, point 76, resistance 77, point 78, resistance 79, variable potentiometer 80, plate or anode 73, cathode 71, to the ground on lead 97. Resistance 77 is used in conjunction with the gaseous discharge tube 81 and serves in conjunction with the discharge tube to regulate the voltage supply to the plate circuit of tube 67. An increase of current flow through 77 will cause a greater potential drop therethrough so that point 78 will tend to be at a lower potential. The characteristics of gaseous tube 81 are such that less flow will then take place through the tube so as to tend to raise the potential of point 78, thereby keeping the point at a constant potential. Other means may be employed to regulate the voltage if desired or the regulator may be omitted. Condensers 85 are used in a conventional manner to assist in keeping the circuit stable and particularly so during changes in voltage. The screen grid 72 is supplied from the power source 75, line 235, point 76, lead 83, and resistance 84. Screen grid 72, if desired, may also be supplied from the lead 86 so that it will receive a constant source of potential. The increase in flow of current in the plate circuit of tube 67 will cause an increase of flow through resistance 80 so that the potential drop between 81 and 82 will be increased, thereby increasing the negative potential of grid 89 of tube 90. The potentiometer 80 is made variable so that the instrument may be internally calibrated in a manner to be described presently. Resistance 91 may be used for the purpose of keeping the grid at a steady state ground potential. Screen grid 92 of tube 90 may be supplied from lead 83 through a conventional resistance in a manner similar to that described for tube 67. The plate circuit is fed from power supply 75, line 235, point 76, lead 83, resistance 95, resistance 94, plate 93, cathode 96 to ground on lead 97. With a decrease in the current flowing in resistance 94 due to the surge, the potential drop between 98 and 99 is reduced so that point 99 becomes more positive, thereby causing the control grid 100 of tube 101 to become more positive, the point 99 being connected to control grid 100 through condenser 102 in a conventional manner. The cathode 103 is connected through resistance 104 to the ground in a conventional manner to obtain cathode bias voltage relative to the grid. The plate circuit of tube 101 includes positive supply point 105, lead 106, lead 107, resistance 108, lead 109, plate 110, cathode 103, resistance 104, and to ground on lead 97. The tube 111 is of the uni-directional type or rectifying type wherein current will flow in one direction only between the anode 112 and cathode 113. The circuit of this tube is connected across resistance 108 by lead 114, condenser 115, lead 117, lead 116, anode 112, cathode 113, lead 118, to point 119. There will be a steady state established in this tube when the device is first turned on, resulting in a steady state charge on condenser 115. As the plate circuit of tube 101 has its conduction increased so that a greater flow takes place through resistance 108, the tube 111 will allow this increase to be transmitted therethrough so that condenser 115 will charge. When the transient surge decreases, inasmuch as tube 111 is unidirectional, the charge on condenser 115 cannot discharge so that it will remain, and thus condenser 115 will have a charge proportional to the build-up or peak of the transient surge.

The electron voltmeter tube 120 is used in an inverted manner similar to that of tube 41, as described for Fig. 1 wherein the conventional plate 121 is used as the control element and the conventional grid 122 is used as the anode. The conventional cathode 123 is used in its normal capacity. Electron tube 120 is in one leg of the Wheatstone bridge of the electronic tube voltmeter in a manner similar to that described for Fig. 1. 124, 125, 126 and 127 are apexes of the Wheatstone bridge circuit wherein the electron tube is in the leg 127—124, resistance 128 is in the leg 124—125, resistance 129 is in the leg 125—126, and resistance 130 is in the leg 126—127. Apex 125 of the bridge consists of variable resistance 131 for the purpose of adjusting the bridge. The power supply for the bridge is across apex 125 and 127, and is supplied by the power supply pack through lead 106 and lead 132 in a manner which will be described presently. A three-blade gang switch of conventional construction having blades 133, 134, 135, may be used, if desired, and may have a common operator as indicated schematically by the dotted line. When the gang switch is in its central position, as shown in Fig. 3, blade 133 is connected to contact 136 and blade 134 is connected to contact 137. In this position, the meter 138 is connected by means of leads 139 and 140 to apex 124 and 126 respectively of the bridge circuit.

The operation of this much of the circuit is similar to that of Fig. 1 wherein a transient electrical surge impressed on terminals 64 will cause a charge to be placed upon condenser 115 during the build-up of the surge, which will cause the meter 138 to be deflected, due to the unbalance set up in the bridge circuit. The purpose of the gang switch 133, 134, 135, will become apparent in connection with the discussion of the calibrating device. If the gang switch be moved to the extreme right, switch blade 135 will be connected with contact 141 so that lead 142 and lead 143 will be connected together across tube 111, thereby discharging the condenser and returning the device to its steady state condition. This operation takes the place of switch 63 of Fig. 1. It is to be noted that leads 116, 117 and 142 must have a very high resistance relative to the other portions of the circuit so as to maintain the charge upon the condenser and prevent leakage, thus insuring the accurate reading of the surge.

*Power supply*

The power supply or power pack may take the form of that shown generally at 144, although it is to be understood that other types may be used, although the general arrangement shown at 144 is particularly advantageous in an instrument such as that shown. The A. C. power supply is furnished in a conventional manner across terminals 145 to the primary of the transformer at 146 having a core 147. A full wave rectifying tube, such as for example the 5V4G, is shown at 148 of usual design having two sets of electrodes at 149 and 150 and with a filament or heater 151. One of the electrodes at 149 is supplied from the end 152 of the secondary 153 and the other of the electrodes 150 is supplied from end 154 of the secondary 153. A center lead 155 is connected through lead 156, lead 157 to the ground at 158, in the usual manner. The positive side of the power supply is transmitted through lead 171, choke coil 160 to point 75, and from there through the leads that have been described previously to the circuits of tubes 67 and 90. The full wave rectifying tube 161 is generally similar to 148 and may have the electrodes connected to the same or different points on secondary 153, depending upon the voltage desired. In the instant case, these are connected at the end of secondary 153. The output of tube 161 is connected by lead 162 to resistance 163, and lead 132 to the Wheatstone bridge. Resistance 165 is connected to resistance 163, and this in turn is connected to supply point 105 and lead 106 and then to the other side of the Wheatstone bridge circuit. The last mentioned circuit also gives a positive supply to one side of resistance 108 and to tube 101. The resistance 166, condensers 167, 168, 169 and 170 are used in a conventional manner for the power supply.

By the use of the two full wave rectifying tubes, it is possible to maintain a stable condition in the circuit at the moment when the surge is impressed thereon, and particularly in the amplifying tubes. As has been set forth, the plate circuits of tubes 67 and 90 are supplied by the full wave rectifying tube 148 from point 75. The anode circuits of tubes 101 and 120 are supplied from the full wave rectifying tube 161. When the transient surge is impressed on the circuit and tubes 67 and 90 become conducting, the flow of current through the plate circuit of 101 is materially increased. If the amplifying tubes of the circuit were supplied from the same tube, the sudden increase in flow as tube 101 becomes conducting would affect the supply to the amplifying tubes and cause them to become unstable. By the separation of the supply of these two groups of tubes, the effects of the drawing of current from one is isolated from that of the other so that the tubes tend to remain in a stable operating condition. A greater or less number of amplifying tubes may be used if desired as long as a positive impulse is supplied to the grid of tube 103.

*Calibrating circuit*

A calibrating circuit is shown generally at 172, which may be used for the internal calibration of the instrument. It is desirable to be able to calibrate an instrument similar to the one described herein in a simple and direct manner. To do this, a known voltage may be impressed upon the input of the circuit and the meter adjusted to correspond with this voltage. By the present invention, it is possible to use the same meter employed in the electron tube voltmeter to read the voltage impressed upon the main circuit. If the calibrating voltage is to be impressed upon the main circuit for a period of time so as to adjust the instrument, it is necessary that a square topped wave form be used or one in which the peak value is obtained instantaneously. This may be accomplished in the present instance by the use of a gaseous tube or high vacuum tube circuit. The term "electronic control tube" covers these tubes and others which give a full voltage peak almost instantaneously upon a proper change of control bias. 173 is a gaseous tube of the "thyratron" or similar type having an anode or plate 174, cathode 175 and control grid 176. The plate circuit of this tube may be furnished from the power supply point 75, lead 177, resistance 178, resistance 179, lead 180, resistance 181, resistance 182, plate 174, cathode 175, resistance 183, to the ground at 184. A resistance 239 may be used to keep point 240 at a lower potential than point 75 when tube 173 is not conducting. The control grid 176 is maintained negative by battery 185 through resistance 186. A switch having a blade 188 may be employed to charge and discharge condenser 189 to trip or render the tube 173 conducting or non-conducting when desired. When the switch is in the position shown, switch blade 188 will contact 190 so that current will be supplied through line 180, resistance 181, 182, lead 191, switch blade 188, condenser 189, thereby charging the same. When it is desired to trip tube 173, the switch 188 is pressed to its lower position whereby blade 188 will contact 192, allowing condenser 189 to discharge through resistance 193, lead 194, resistance 195, to ground at 184. The discharge of the condenser 189 will cause point 196 to become more positive, whereby grid 176 will become sufficiently positive to allow tube 173 to become conducting. When switch 188 is returned to its normal position, the plate circuit of tube 173 will be momentarily shorted to the ground through condenser 189 and line 191, thereby causing the tube 173 to become non-conducting. The flow of current in the plate circuit causes a potential to exist between 197 and the ground, across resistance 183. In order to measure the value of this potential, the gang switch 133, 134, 135 may be moved to the left so that blade 133 contacts 198 and blade 134 contacts 199.

The meter 138 will then measure the voltage drop across resistance 179 which will give the IR drop due to the flow of current through the resistance, which will also be the flow of current in the plate circuit of the tube 173. It is preferable that the instrument be so designed that the voltage drop across resistance 179, giving a deflection D on meter 138 for a given current flow in the plate circuit of tube 173, will be the same as the deflection on meter 138 when the voltage drop across resistance 183, due to the same current flow, is impressed on the main circuit, meter 138 being connected in the main circuit. This voltage drop across 183 is impressed on the main circuit, as described, when the switch 55 is in its lowermost position connected to contact 200. It is of course possible to apply a factor to the deflection D read on meter 138 and to use different values of resistances 179 and 183, but, as stated, it will be more convenient if the deflection obtained by connecting 138 across 179 will be the same as when the calibrating circuit potential is impressed on the main circuit. The flow of current in the plate circuit of tube 173 may be adjusted by the variable resistance 181 to obtain the desired value or different values of voltage to be impressed upon the main circuit. After having set the calibrating circuit to the desired flow of current, the tube 173 may be rendered non-conducting, as previously described, and the gang switch 133, 134, 135 returned to its central position so that the meter is again connected in the Wheatstone bridge circuit. The switch 55 is then moved to its lower position so that the calibrating circuit 172 is connected across the input of the main electronic circuit. The tube 173 is then tripped in the manner just described by the discharge of condenser 189 and the square topped wave resulting therefrom will be impressed upon the main electronic tube circuit, and the peak voltage is therefore impressed immediately on the main circuit. The meter may then be read and the variable potentiometer 88 suitably adjusted so as to give the correct reading upon the meter 138. In this manner, the instrument may be internally calibrated without the use of external sources of known voltage or any difficulty that might be obtained in supplying a voltage of a certain characteristic as regards voltage time build-up. A voltage-time curve is shown in Fig. 4, which will be obtained by the device shown wherein the tube is tripped, for example, at 201, obtaining the peak value indicated at 202. It is to be noted that the voltage has obtained its peak instantaneously and is maintained at this value. The variable potentiometer 80 may be employed so that equal deflections may be obtained on the meter when in the calibrating circuit and when in the main circuit. In this manner, the circuit may be adjusted internally after having set the variable condenser 70 in accordance with a predetermined calibration of the gauge used.

A slightly different type of calibrating circuit is shown in Fig. 5, wherein the use of a condenser in the tripping of the tube is eliminated. Similar parts in this figure are given the same number as those appearing in Fig. 3. In this circuit an additional blade is added to the gang switch, as indicated at 203. The meter 138 may be placed across resistance 179 by the moving of the gang switch to the left in a manner similar to that of Fig. 3. In such a case, the power supply is through 179, contact 204, switch blade 203, lead 205, resistance 181, resistance 182, plate 174, cathode 175, resistance 183, to the ground. In order to render the tube conducting, the switch 206 may be closed, connecting control grid 176 to the ground at 207, thereby raising the potential of the grid in the positive direction so as to trip the tube. In order to render the tube non-conducting in this modification, the gang switch 133, 134, 135, 203 may be moved to the right so as to disconnect the power supply to the plate circuit of tube 173. The use of the circuit of Fig. 5 is otherwise identical to that shown in Fig. 3, and may be used in place of the calibrating circuit thereof if desired.

It is evident that the tube 173 may be replaced by a relay if desired, although such is not as satisfactory as the circuit shown.

Fig. 6 shows a portion of an indicating instrument which may be used in conjunction with the other parts of the circuit just described for the purpose of calibrating the various gauges used or where it is desired for some reason to measure a surge which builds up in the negative direction as shown at AC in Fig. 2. Parts of this circuit which are the same as Fig. 3 have been given the same numbers, and it is not deemed necessary to describe them. As was explained for Fig. 3, the increase of the transient surge to its peak causes grid 100 of tube 101 to become more positive, thereby increasing conduction through tube 101. The purpose of this is to decrease the resistance of tube 101 when the instrument is operated, so as not to increase the time factor involved in charging condenser 115. If the tube 101 decreases in conductivity, the resistance therein increases, which will adversely affect the time in which it takes the condenser to charge. It has been found that the piezo-electric crystals which are to be used may be calibrated and will give the same results if they be loaded to a given pressure and then the load suddenly removed. The change in voltage during the build-up in the negative direction developed in such a manipulation will be the same as if the crystal had been loaded with an identical force. It is desirable, however, to have a positive impulse placed upon tube 101. In order to thus calibrate a piezo-electric crystal or to use a surge accordingly, a switch 208 may be provided, having four contacts, 209, 210, 211, 212. When the switch blade 208 (Fig. 6) is on contact 209, the circuit will operate in the manner described for Fig. 3, wherein a transient surge impressed upon leads 64 will cause grid 100 of tube 101 to become more positive. This will in turn cause condenser 115 to charge and retain its charge, which will affect control element 121 of the inverted electronic tube 120 used in the electronic tube voltmeter. The effect of the surge will then appear on the electronic tube voltmeter element, as shown in Fig. 3, it not being deemed necessary for the purposes of this portion of the description to illustrate the entire device. The anode element 122 of tube 120 may be connected to point 124 shown in Fig. 3 and the cathode connected to point 127 of Fig. 3. The switch blade 213, which may be mechanically operable with switch 208, cooperates with contacts 214, 215, 216 and 217. When it is desired to measure the transient surge in the negative direction, switch 208 and blade 213 are moved so that 208 is connected to contact 210. At this time, blade 213 is connected to contact 215. The circuit will then be from lead 218 through lead 219, contact 215, blade 213, condenser 220, to the control grid 221 of tube 222. Tube 222 may be of the conventional screen grid type having screen grid 223, plate 224 and cathode 225. The screen grid may be supplied from line 235 which is connected to point 75 (Fig. 3) of the power supply. The screen grid is supplied from line 235 through lead 236, resistance 237 and line 238. The negative surge applied will cause the grid 221 to become more negative so that the flow through the plate circuit of tube 222 will be decreased. The plate circuit may be from point 78, lead 226, resistance 227, resistance 228, plate 224, cathode 225 and to ground at 229. A reduction in the plate current will result in a decrease in the potential drop between points 230 and 231 so that 231 will become more positive. Point 231 is connected by lead 232, contact 210, switch blade 208, condenser 68, to control grid 69, so that a positive impulse is placed on the negatively biased grid 69 of tube 67. The remainder of the circuit will then operate in the same manner as that described for Fig. 3.

In using the negative surge as the means for charging condenser 115 and obtaining the reading on the meter, it is desirable to be able to calibrate the device under a corresponding condition, namely the cutting off of the calibrating circuit. This may be accomplished by moving switches 208 and 213 to contacts 211 and 216 respectively. When in this position, lead 233 from the point 197 (Fig. 3) of the calibrating tube 173 is connected to lead 234, contact 216, switch blade 213, control grid 221 of tube 222. In this manner, the calibrating circuit is connected to tube 222, which is interposed in the main electronic circuit so that when the calibrating circuit tube is rendered non-conducting or stopped, the impulse delivered to tube 101 will be positive so as to increase the conduction in tube 101. The meter 138 of Fig. 3 may then be calibrated in a manner similar to that described for Fig. 3.

When it is desired to calibrate the main electronic circuit for the build-up in a surge as described in Fig. 3, the switch blades 208, 213, are moved to their lower-most position or where they are connected to contacts 212 and 217 respectively. When in this position, the calibrating circuit is connected to lead 233 to the main circuit in the same manner as in Fig. 3. The instrument circuit shown in Fig. 6 in conjunction with that in Fig. 3, as described, is particularly useful for laboratory service where the piezoelectric crystal gauges or other gauges are calibrated before they are sent to the places where they are used in commercial instruments. Piezo-electric crystals so calibrated may then be used in instruments similar to Fig. 3, and the variable condenser 70 set to correspond with the calibration of the gauge. Variable condenser 70, for convenience in such use, may be of the decade type, so that it may be readily set to the desired capacity. It is to be understood that a variable resistance may be substituted for condenser 70, in which case the instrument can be made to read the maximum rate of increase of pressure instead of maximum pressure. In use, when it is desired to so calibrate a piezo-electric crystal, the crystal is connected across leads 64 and a known force applied thereto. Switch 208, 213 is then placed in its second position or where the blades 208, 213 are connected with contacts 210 and 215 respectively. Then, when the load is suddenly released from the gauge, a surge will be developed which is negative in direction and the build-up thereof will be properly measured because, as described, a positive impulse will still appear on grid 100 of tube 101. The meter connected with electronic tube voltmeter circuit may then be read and the calibration of the gauge determined.

In Fig. 9 there is shown a further modification of the electron tube voltmeter of Fig. 3 wherein identical parts are shown by the same numerals. A compensating resistor is shown at 240 in the cathode circuit of tube 120. In this circuit, the position of the power supply and meter of the Wheatstone bridge circuit is different from that shown in Fig. 3. The positive power supply lead 132 is connected to apex 124, and the power lead 106 is connected to apex 126 through lead 241. The meter is connected by leads 139 and 140 to apexes 125 and 127 respectively. It is to be noted that these connections are the reverse of those shown in Fig. 3. Leg 124—125 of the bridge has resistance 128 therein; leg 125—126 has resistance 129 therein; leg 126—127 has the degeneration resistance 240 therein; and leg 127—124 has the inverted electronic tube 120 therein. The operation of the degeneration resistor occurs, for example, when the control element 121 of tube 120 becomes more positive, thereby passing more current through tube 120. When this occurs, the flow from point 124 through 127 to 126 will be increased through the degeneration resistance 240 so that point 126 will become more negative. This will be carried to condenser 115 and will affect the control element 121 so as to lower the potential thereon, thus tending to counteract the positive charge which has caused the increased conduction of tube 120. A similar action will take place in the reverse manner as the control element 121 becomes more negative, decreasing the conductivity of tube 120. This will tend to raise the potential of point 126 due to the decreased flow through resistance 240, thus tending to raise the potential of element 121. It is evident, therefore, that small changes in the supply for the electronic tube voltmeter will be counteracted by this degeneration resistor. The linear range of the voltmeter will also be extended, because with increased changes in potential of the control element 121 there will be a corresponding greater counteracting force due to the degeneration resistor 240. Likewise, changes in the character of the electronic tube 120, resulting from the aging thereof or from an inter-change of tubes, will tend to be minimized by such a resistor.

The condenser 40, shown in Fig. 1 for example, and its related circuit must be such that the time constant or product of the resistance in the charging circuit by the capacity of the condenser will be as small as possible so as to fully charge the condenser in a minimum of time. Opposing this is the requirement that the product of this capacity by the total leakage resistance be as large as possible so as to maintain the initial voltage on the condenser a maximum length of time in order to have the reading accurately appear on the voltmeter. In the use of the device for measuring the pressure build-up in a gun, it was found that this build-up time to maximum pressure was between .15 and 1.5 milliseconds. Considering the fundamental formula for the charging of a condenser $$(1) \qquad E_t = E_M \left(1 - \epsilon^{-\frac{T_c}{R_c C}}\right)$$

$E_t$ is the voltage on the condenser, at a time $T_c$, $E_M$ the maximum voltage applied to the condenser, $T_c$ the time, $R_c$ the resistance of the circuit, and $C$ the capacity. It is preferable that the design be such that the condenser will reach at least 99% of the maximum charge during the build-up time. The time $T_c$ should be reached in about $\frac{1}{10}$ of a millisecond, as for example in the case of .30 caliber ammunition. It is understood that this varies with the type of ammunition or use of the device. If a curve of voltage against time, in accordance with the above formula, is plotted, it will be seen that as the time is increased the curve will approach asymptotically to the voltage applied. Therefore, in the above formula, making $$\frac{E_t}{E_M} = .99,$$

$$(2) \qquad \frac{E_t}{E_M} = .99 = 1 - \epsilon^{-\frac{T_c}{R_c C}}$$

This will become $$(3) \qquad \epsilon^{-\frac{T_c}{R_c C}} = 0.01$$

or $$(4) \qquad \epsilon^{\frac{T_c}{R_c C}} = 100$$

Then by solving for the exponent $$\frac{T_c}{R_c C}$$

by the use of suitable tables or in any other manner, $$(5) \qquad \frac{T_c}{R_c C} = 4.606$$

Then $$(6) \qquad RC = \frac{T_c}{4.6C}$$

wherein $T_c$ is the charge time in seconds, $R_c$ total effective charging resistance in ohms which will include the internal resistance of tubes 34 and 39 plus resistance 36, and $C$ is the capacity of the condenser in farads.

The discharge characteristic of a condenser has the fundamental formula $$(7) \qquad E = E_c \left( \epsilon^{-\frac{T_R}{R_L C}} \right)$$

and solving this formula in a similar manner for the exponent $$\frac{T_R}{R_L C}$$

assuming that it is desired that an accuracy within 1% be obtained in the time $T_R$ the instrument is to be read after the voltage occurs, the relation existent will be $$(8) \qquad R_L = 100 \frac{T_R}{C}$$

In Equation 7 E is the voltage of the condenser at a time $T_R$ and $E_c$ is the voltage to which the condenser is initially charged. When the voltage of the condenser against time is plotted for discharge there is a comparatively steep curve approaching the zero voltage line asymptotically as the time increases. In the above Formula 8, $T_R$ is in seconds, $R_L$ is the total effective leakage in megohms, C is the capacity of the condenser in microfarads. The leakage will include connections between the tube 39, the control element 42 and the plate of the condenser 40. In addition to this, as shown in circuit Fig. 3, leakage resistance will also include the lead 142 to the meter. Using Equations 6 and 8, which will give results within 1% accuracy, and substituting the time required to read the meter, the size of condenser and resistance may be determined for a given charging time. It is to be understood, of course, that these times and accuracies may be changed as desired.

By the present invention, a method and apparatus are provided for determining the pressures developed in cartridges as they are fired in production testing which provides for easy operation, calibration and accuracy. The same method and apparatus can be used for measuring any change in condition whereby a transient electrical surge can be produced.

The invention is not to be construed as limited to the device illustrated, but is to be extended to all equivalent devices and methods coming within the scope of the appended claims.

What is claimed is:

1. An apparatus for measuring pressure including a single transient electrical surge producing means, said surge being proportional to the pressure; a rectifying tube circuit including a capacitor, said capacitor being charged in proportion to the surge at each instant of time; means to retain the maximum voltage produced by said surge including an electronic voltmeter tube having two elements and a third element therebetween, one of said first mentioned elements being connected to said capacitor; and an electronic tube voltmeter bridge circuit responding to linear proportion to the maximum voltage including said last mentioned electronic tube in one leg, resistances in each of the other legs, and an electrical measuring means connected to said bridge and measuring the peak voltage on the capacitor.

2. An apparatus for measuring pressure including a piezo-electric crystal circuit adapted to produce a single transient electrical surge proportional to a change in said pressure; a rectifying tube circuit connected to said crystal circuit and including a capacitor, said capacitor being charged to a peak voltage in proportion to said surge; means to retain the maximum voltage produced by said surge, comprising an electronic tube including two electrodes and a third electrode therebetween, one of said first mentioned two electrodes being connected to said capacitor; and an electronic tube voltmeter bridge circuit including said last mentioned electronic tube in one leg, resistances in each of the other legs and an electrical measuring means connected to said bridge and measuring the peak voltage of the charge on said capacitor, the resistance of the rectifying tube circuit and capacity of said capacitor being such as to allow full voltage to be reached on said condenser in less than the maximum build-up time of the surge and the leakage resistance being sufficiently high to allow the measuring means to indicate the true value of the peak of the surge.

3. An apparatus having a plurality of associated circuits for measuring a change in pressure, including a piezo-electric crystal circuit adapted to produce a single transient electrical surge and peak voltage proportional to a change in said pressure; a rectifying electronic tube having elements serving to pass one direction of said surge; means to retain the maximum voltage produced by said surge, including an electronic voltmeter tube having the control element thereof connected to one element of the rectifying tube; a condenser having one plate thereof connected to said control element, the connections between said electronic voltmeter tube element, said element of the rectifying tube and one plate of the condenser having a high resistance relative to all associated circuits of the apparatus, and an electronic tube voltmeter bridge circuit including said last mentioned electronic tube in one leg, resistance in each of the other legs, and an electrical measuring means connected to said bridge and measuring the peak voltage of the charge on said capacitor, the resistance of the rectifying tube and connections thereof to the condenser and capacity of said condenser being such as to allow full voltage to be reached on said condenser in less than the maximum build-up time of the surge and the leakage resistance being sufficiently high to allow the measuring means to indicate the true value of the peak of the surge.

4. An apparatus for measuring a change in force including a force responsive means for producing a single transient electrical surge; a main electronic tube circuit connected thereto and having at least one electronic tube with a plate circuit therefor; an electronic tube voltmeter circuit having a meter therein, said voltmeter circuit being connected to said main electronic tube circuit and a variable impedance connected across said main tube circuit and said force responsive means adjustable in accordance with the calibration of the particular force responsive means used; and a variable means in the plate circuit of one of the main electronic circuit tubes for adjusting the internal calibration of the main electronic tube circuit whereby a known potential difference may be impressed across the main electronic tube circuit and the apparatus internally calibrated.

5. An apparatus for measuring a change in condition including a single transient electrical surge producing means, said surge being proportional to the change; electronic tube amplifying circuits through which said surge is passed; a rectifying tube circuit connected to the last amplifying tube circuit, the last amplifying tube circuit being so arranged that the current flow therethrough increases with the build-up of the surge; a capacitor in the rectifying tube circuit, said capacitor being charged in proportion to the surge; and means to measure the charge on the capacitor.

6. In an apparatus for measuring a change in a condition, means to set up a single transient electrical surge proportional to said change; a plurality of electronic tube amplifying circuits through which said surge may pass, each having an electronic tube and plate circuit; an electronic tube connected to one of said plate circuits serving to pass one direction of said surge; a condenser connected to said last mentioned electronic tube; an electronic tube voltmeter connected to said condenser to measure the surge; a power supply for said tubes comprising two full wave rectifying tubes, the last amplifying tube circuit and electronic voltmeter tube being supplied from one of said full wave rectifying tubes, thereby preventing instability in the other electronic tubes as the last amplifying tube and voltmeter tube become conducting.

7. In an apparatus for measuring force including force responsive means for producing a single transient electrical surge proportional to a change in said force, a rectifying electronic tube circuit, a condenser connected to said tube circuit and chargeable during the build-up of said surge in a positive direction as the force is increasing, a phase inversion circuit including an electronic tube circuit selectively connectable between said force responsive means and said rectifying tube to change the direction of said surge so that the condenser may charge upon a build-up of a surge in the negative direction by said surge-producing means when the inversion circuit is connected in the circuit.

8. In an apparatus of the class described; means for producing a single transient electrical surge; an electronic tube circuit, means for connecting a meter thereto for measuring the peak value of said surge; a calibrating circuit including a normally non-conducting gaseous tube with a plate-cathode circuit and input therefor; means to start conduction of said gaseous tube; means to connect said gaseous tube to said electronic tube circuit so as to impress a potential developed in said gaseous tube plate-cathode circuit on said electronic tube circuit; and means to connect said meter to said gaseous tube plate-cathode circuit, said last mentioned means including a resistance to give a measure of the potential impressed upon the first electronic tube circuit when the gaseous tube is conducting and connected thereto, whereby the apparatus is directly calibrated.

9. In an apparatus of the class described and including force responsive means to produce a single transient electrical surge proportional to a change in said force; a rectifying electronic tube circuit; a condenser connected to said tube circuit and charging during the positive build-up of said surge as the force is increased; an electronic tube voltmeter circuit; means to connect a meter to said voltmeter circuit to measure the peak value of said surge; a calibrating circuit including a gaseous electronic tube with a plate-cathode circuit and input therefor; means to connect said gaseous tube to said rectifying tube circuit; means to start conduction of said gaseous tube; means to connect said meter to said gaseous tube plate-cathode circuit; a phase inversion electronic tube circuit including an electronic tube; and means to connect said phase inversion circuit to said rectifying tube circuit to change the direction of said surge so that the condenser may charge upon a negative build-up of a surge when the phase inversion circuit is connected between the force responsive means and rectifying tube.

10. An apparatus for measuring changes in condition including a means responsive to said change in condition and adapted to produce a single transient electrical surge; a circuit including a capacitor, said capacitor being charged in proportion to said change in condition during the build-up of said surge only; an electronic voltmeter tube having three electrodes, one of which serves as a control element; means to connect said control element to said capacitor, an electronic tube voltmeter bridge circuit including said last mentioned electronic tube in one leg, resistances in each of the other legs, and a degenerative connection between one point on said bridge and said control element; and an electrical measuring means connected to said bridge and measuring the peak value of the charge on said capacitor.

11. An apparatus for measuring the peak value of a change in condition including means to produce a single transient electrical surge proportional to said change at each instant of time; a condenser; means to charge said condenser during the build-up of said surge only, the peak voltage of said charge being proportional to the peak of said surge; means to retain the peak voltage on said condenser; and indicating means linearly responsive to said peak voltage thus retained, said peak voltage being retained for a sufficient time to allow the indicating means to indicate the true value of the peak of said surge.

12. An apparatus for measuring the peak value of a change in condition including a circuit having means to produce a single transient electrical surge proportional to said change; a condenser; means to charge said condenser during the build-up of said surge only, the peak voltage on said condenser being proportional to the peak of said surge; means retaining the peak voltage on said condenser; and indicating means linearly responsive to said peak voltage thus retained, said condenser and means to charge said condenser having a sufficiently small lag in charging time to allow the maximum value of the voltage produced by the surge to appear on the condenser, and said voltage retaining means preserving the charge on the condenser for sufficient time to allow said measuring means to indicate the maximum voltage thus produced.

13. An apparatus for measuring the peak of a surge produced by a change of condition, comprising means to produce a single transient electrical surge; means to produce a voltage proportional to said surge at each instant of time; and means for retaining for a long interval the maximum voltage so produced, including an electronic tube having two elements and a third element therebetween, one of said first two mentioned elements serving as the control element and having said maximum voltage applied thereto, said other two elements being connected to a bridge circuit, said bridge circuit having a measuring means therein to indicate the true value of the maximum voltage.

14. An apparatus for measuring a change in condition, comprising means to set up a single transient electrical surge and voltage proportional to the surge at any given instant of time, said voltage being proportional to said change; a condenser; means to charge said condenser during the build-up of said surge only; means for retaining on said condenser the maximum surge voltage produced by the single transient electrical surge means, said condenser being constructed and having a dielectric such that the voltage retained thereon is substantially equal to the maximum voltage applied; and indicating means responsive to the voltage thus retained on the condenser, said indicating means not substantially dissipating the retained voltage until after the indicating means has given a true reading of the maximum voltage.

15. An apparatus for measuring a change in condition, including means to set up a single transient electrical surge and voltage proportional to said change at each instant of time; a condenser; means to charge said condenser during the build-up only of said surge so as to give a peak voltage proportional to the peak of said change; and means to measure the charge on the condenser, said condenser including a dielectric and having an absorption factor of less than 1% so as to give within 1.0% accuracy in the condition change determination, said charging and measuring means characteristics being such that the full peak voltage is maintained on the condenser for sufficient time to allow said measuring means to indicate the maximum voltage on the condenser.

COLIN IRVING BRADFORD.